(12) United States Patent
Kippschull et al.

(10) Patent No.: US 7,303,206 B2
(45) Date of Patent: Dec. 4, 2007

(54) ATTACHMENT OF A CURTAIN AIRBAG ASSEMBLY TO A VEHICLE

(75) Inventors: Bernd Kippschull, Rödermark-Urberach (DE); Robert Negele, Altenstadt (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 286 days.

(21) Appl. No.: 11/053,392

(22) Filed: Feb. 8, 2005

(65) Prior Publication Data

US 2005/0179238 A1 Aug. 18, 2005

(30) Foreign Application Priority Data

Feb. 16, 2004 (DE) ................. 10 2004 007 415

(51) Int. Cl.
*B60R 20/21* (2006.01)
(52) U.S. Cl. ................. 280/728.2; 280/730.2
(58) Field of Classification Search ............ 280/730.2, 280/728.2, 728.1, 730.1; 208/749
See application file for complete search history.

(56) References Cited

U.S. PATENT DOCUMENTS

| | | | | |
|---|---|---|---|---|
| 5,379,726 A | * | 1/1995 | Mann | ............ 119/793 |
| 6,073,961 A | | 6/2000 | Bailey et al. | |
| 6,896,288 B2 | * | 5/2005 | Tanaka et al. | ............ 280/743.2 |
| 2002/0163169 A1 | * | 11/2002 | Fischer | ............ 280/730.2 |
| 2003/0178832 A1 | | 9/2003 | Dominissini et al. | |
| 2004/0000775 A1 | | 1/2004 | Henderson et al. | |
| 2004/0012172 A1 | | 1/2004 | Delignny et al. | |

FOREIGN PATENT DOCUMENTS

| | | |
|---|---|---|
| DE | 101 54 964 A1 | 5/2003 |
| DE | 103 47 205 | 6/2005 |
| EP | 0 791 511 A1 | 8/1997 |
| EP | 1 138 558 A2 | 10/2001 |
| EP | 1 464 549 A | 10/2004 |
| WO | WO 02/28691 A1 | 4/2002 |

* cited by examiner

*Primary Examiner*—Paul N. Dickson
*Assistant Examiner*—Robert A. Coker
(74) *Attorney, Agent, or Firm*—Lonnie Drayer

(57) ABSTRACT

A curtain airbag assembly has, for fastening purposes, at least one strap attached to the airbag. The strap is held in position by being guided through a passage behind a hanger projecting in the manner of a bracket from the structural member of a vehicle. The strap is secured in place by being folded by an angle of more than 90° around at least one edge of the hanger and by at least one means for fastening.

8 Claims, 4 Drawing Sheets

ATTACHMENT OF A CURTAIN AIRBAG ASSEMBLY TO A VEHICLE

FIELD OF THE INVENTION

The present invention relates to a curtain airbag assembly, a method of fastening a curtain airbag assembly to a structural member of a motor vehicle, and a motor vehicle.

DISCUSSION OF THE PRIOR ART

EP 0 791 511 A teaches curtain airbags that are fastened to a vehicle frame with screws or rivets by their retaining straps. This fastening method is complex.

EP 1 138 558 A teaches a snap-in solution with suitable additional sheet metal fastening means, wherein a sheet metal clip is attached in suitable manner to the airbag, which may subsequently be clipped or attached to the motor vehicle structure. This fastening method is also complex.

WO 02/28691 A teaches fastening a retaining strip for lengthwise tensioning of the airbag, wherein the fabric end of the strip is turned up in such a way that it functions like a barb when inserted into a suitable hole in the motor vehicle structure. For this purpose, however, a relatively thick fabric strip has to be used in order to perform this barb function. This would entail cost-intensive additional effort for fastening the top of the airbag lengthwise to the lateral roof frame.

U.S. Pat. No. 6,073,961 teaches an airbag located in a container, wherein the container is fastened to a structural member by a screw, i.e. the airbag is connected to the structural member prior to installation by a fastening element (e.g. a container). Thus, the airbag has initially to be mounted on this fastening element, in order subsequently to be fastened to the vehicle structure. The result is a time and cost-intensive procedure.

Not yet published commonly owned German Patent Application DE 103 47 205 teaches the use of straps with openings in the fastening areas of an airbag, at which the airbag is intended to be connected to the vehicle frame, through which openings there may extend, in the mounted state, parts of the vehicle frame or fastening elements for fastening the airbag thereto. In addition, a means for fastening may be provided.

SUMMARY OF THE INVENTION

There is provided in accordance with one aspect of the present invention a curtain airbag assembly comprising at least one strap, which is designed to secure the curtain airbag assembly to a structural member of a motor vehicle by being guided through a passage behind a hanger projecting in the manner of a loop or bracket from the structural member of the motor vehicle, by being folded by an angle of more than 90° around at least one edge of the hanger and is secured around the hanger by at least one means for fastening.

It is particularly advantageous for the strap to form, at its end remote from the airbag, a pocket provided as a means for fastening for accommodating a corresponding lug of the hanger, such that, as an alternative or in addition to the use of pins, attachment may be provided by fitting this pocket onto the corresponding hanger lug. This strap pocket also allows attachment of the airbag, in order thereafter to perform final attachment by a pin. The strap pocket ensures deflection of the strap from the plane of the hanger around the edge of the hanger to vertical, which amounts to less than 180°. The pin ensures deflection of the strap from the plane of the hanger about the edge of the hanger by up to 180°, such that attachment proper is effected thereby. However, the strap may also be guided through a passage behind the hanger from below.

DETAILED DESCRIPTION OF THE INVENTION

Figure 1A:
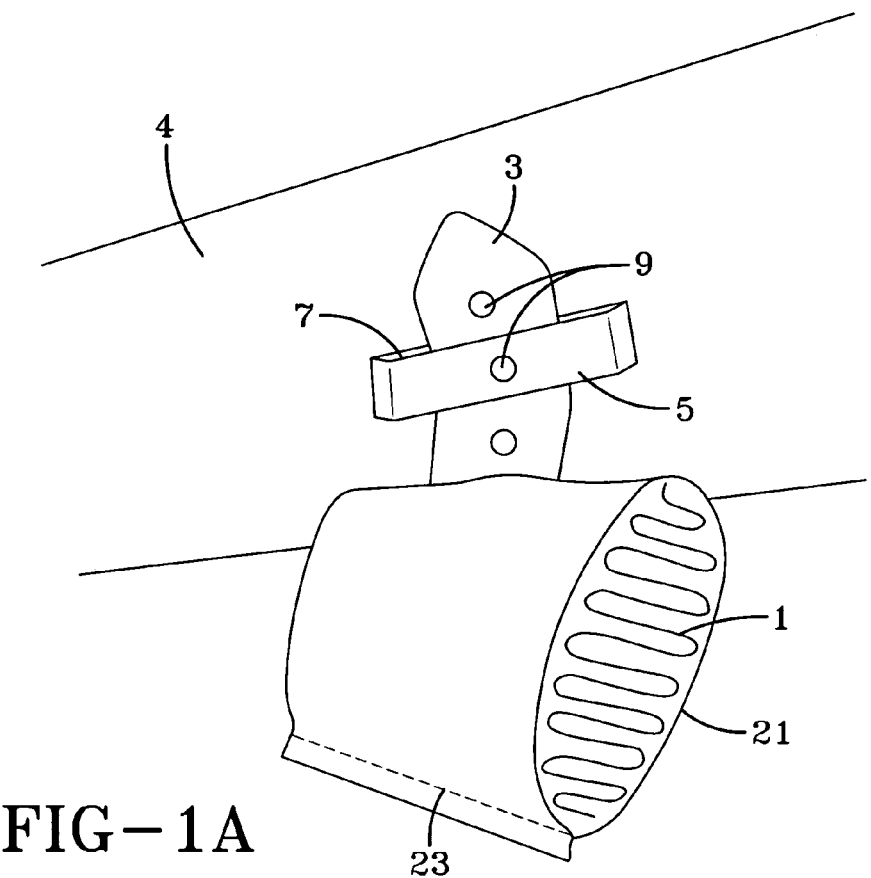
FIG. 1A is a pictorial view of an exemplary embodiment according to the invention of a method of fastening an airbag to a motor vehicle structural member.

Identical components in the following exemplary embodiments have identical reference numerals.

FIG. 1A shows an airbag 1 for a curtain airbag assembly. A strap 3 is attached to the airbag 1. A structural member 4 of a vehicle comprises a hanger 5 projecting in the manner of a bracket or loop. The hanger 5 has a top edge 7. Openings 9 are provided in the strap 3 and in the hanger 5. It is advantageous for the edge 7 to be rounded in such a way that the strap material is not damaged by the hanger in the event of airbag deployment. The hanger 5 extending lengthwise is preferably oriented horizontally in the structural member of the vehicle. In this way, it may be ensured that the forces released upon airbag deployment are distributed evenly along the edge of the hanger. The hanger 5 extends initially perpendicularly out of the structural member, in order thereafter to provide a preferably horizontal zone. In this way, a loop is produced which is accessible from two sides, namely from above and from below. The hanger may also take the form of an initially independent element, which is then fastened to the vehicle structure.

According to a preferred exemplary embodiment, the material of the strap 3 matches the material of the airbag. In addition, the strap and the airbag may preferably be provided in one piece. The strap attached to airbag preferably comprises a fabric material and/or an elastomeric material, which has a higher load-carrying capacity than the airbag material. The at least one strap may also be attached to the airbag by stitching.

The hanger 5 may be punched into the structural member of the vehicle. The hanger may then be located in the sidewall or in the side of the roof facing the sides of the vehicle occupants. Thus, a curtain airbag function is provided. The airbag and the actuated airbag thus extend laterally of the vehicle occupants, in each case along the corresponding vehicle or window side.

In the method illustrated here for fastening the airbag 1 to a structural member 4 of a motor vehicle, positioning of the airbag 1 is achieved by the following steps with reference to FIGS. 1 and 2. The airbag 1, especially for a curtain airbag assembly, is provided with a strap 3. The strap 3 is introduced into a passage behind the hanger 5 projecting in the manner of a bracket or loop from the structural member 4 of the vehicle and subsequently the strap 3 is guided through the passage behind the hanger 5. The strap 3 is then folded over around the edge 7 of the hanger 5. According to the exemplary embodiment illustrated here, the fold-over angle amounts to approximately 180°, since the strap 3 is folded over from an upward orientation to a downward orientation. The strap 3 is held in position by a means for fastening. According to this exemplary embodiment, a means for fastening such as a pin 11 is pushed from the front through the openings 9 in the strap 3 and the hanger 5 and engages a retaining clip or ring 12 on a side of the strap 3 distal from the hanger 5 and is secured thereto. The pin 11 preferably comprises a suitable elastomeric material. It is understood that other suitable means for fastening may be used in the practice of the invention, such as threaded fasteners, rivets, staking, adhesives, welds and other functional equivalents.

The strap 3 is attached in one piece to the airbag 1 and is pushed through an opening or a cut in a sheath 21. The sheath 21 is provided to protect the airbag 1, especially during transport and/or installation. The sheath 21, which may comprise a material of inferior quality to that the airbag 1, has a frangible tear seam 23. Upon deployment of the airbag 1, the frangible tear seam 23 opens and the airbag 1 released, primarily in a vertical orientation. The strap 3 attached to the airbag 1 may comprise a fabric material and/or an elastomeric material, which has a higher load-carrying capacity than the airbag material. The at least one strap 3 may also be attached to the airbag by stitching. The strap 3 and the sheath 21 may also be of one-piece construction and connected to the airbag 1 by stitching.

Figure 1B:
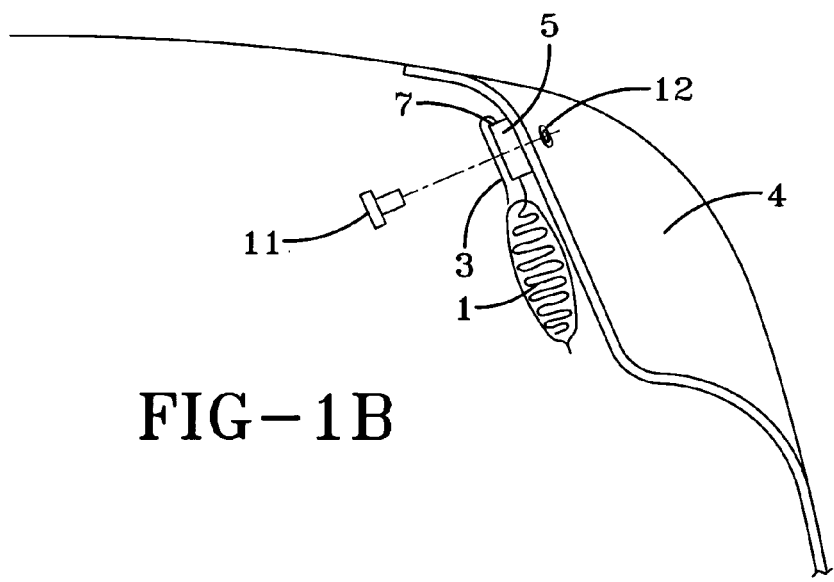
FIG. 1B is a sectional view of an airbag installed according to FIG. 1A.

FIG. 1B is a sectional view of an airbag 1 installed according to the method described above. The airbag 1 has the strap 3 folded over 180° around the upper edge 7 of the hanger 5. The forces arising upon deployment of the airbag 1, which would cause the airbag 1 to be pulled away from the hanger 5, are distributed through the hanger 5 along the top edge 7. So that this immobilization or the provision of maximum frictional force is ensured, the strap 3 is attached by the pin 11 introduced into the openings 9 in the strap 3 and the hanger 5 and fastened therein. The pin remains virtually free of loaded upon deployment of the airbag. In this way, secure fastening of the airbag 1 to the hanger 5 and thus to the structural member 4 of the vehicle is effected.

Figure 2A:
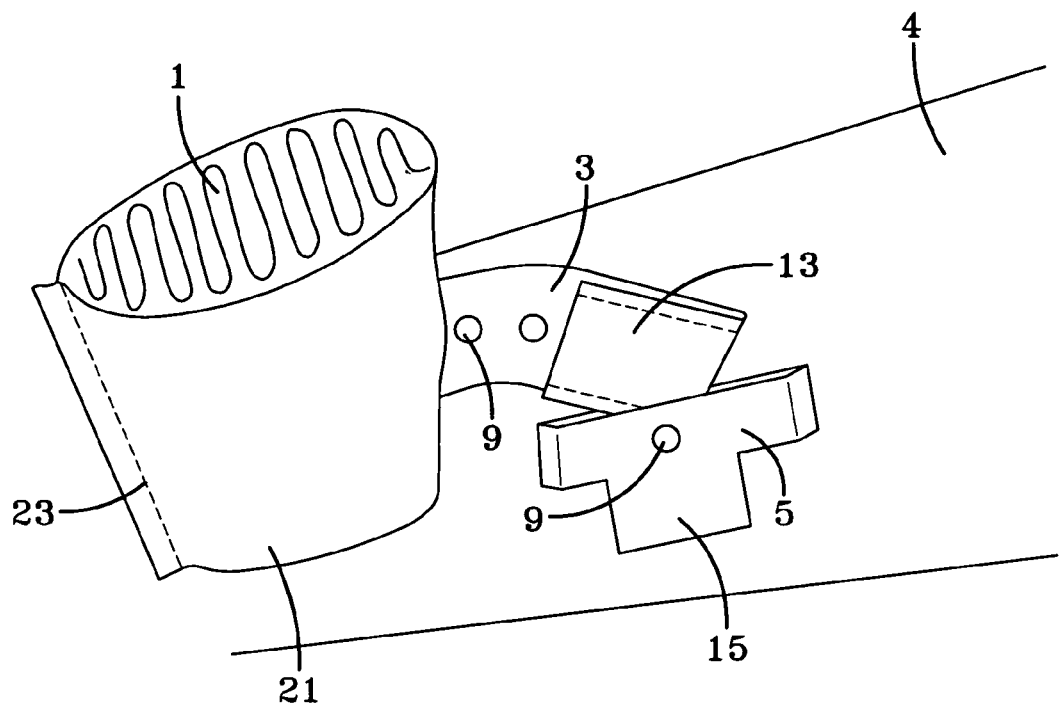
FIG. 2A is a pictorial view of a further method according to the invention for fastening an airbag to a motor vehicle structural member.

FIG. 2A illustrates a further method according to the invention for fastening an airbag 1 having a strap 3 to a structural member 4 of a motor vehicle. Unlike the exemplary embodiment according to FIGS. 1A and 1B, the strap 3 additionally comprises at its end remote from the airbag 1 a pocket 13 provided as a means for fastening for accommodating a corresponding lug 15 of the hanger 5. In addition, openings 9 are provided in the strap 3 and in the hanger 5. In accordance with this method according to the invention for fastening an airbag 1 to a structural member 4, especially a motor vehicle, the following steps are performed.

The airbag 1 is provided with a sheath 21 and a frangible tear seam 23 and a strap 3, which serves as a hanger for a curtain airbag assembly. The strap 3 is then pushed from above completely through the passage behind the hanger 5 projecting from the structural member 4 of the vehicle in the manner of a bracket. The pocket 13 of the strap 3 is pushed out beyond the lower end of a lug 15, which is located on the hanger as a protruding part comprising a free end. By displacing the strap 3 in the opposite direction, the pocket 13 is attached on the lug 15 of the hanger 5 effecting attachment of the strap 3 and the airbag 1 to the hanger 5. The lug 15 is provided in one piece with the hanger 5. However, it may also be attached to the hanger by welding or adhesion. When viewed head on the hanger and lug together take the form of a "T". By fitting the pocket 13 of the strap 3 onto the lug 15, the pocket 13 receives the lug 15. This pocket 13 enables attachment of the airbag 1 and strap 3 to the bracket 5. The strap pocket 13 ensures deflection of the strap 3 from the plane of the hanger 5 around the edge 7 of the hanger 5 to vertical, which results in a deflection angle of less than 180°. The angle is always greater than 90°. By providing openings 9 in the strap 3 and the hanger 5 for a further means for fastening such as a pin 11, attachment or initial attachment may be supplemented by further means for fastening. The pin 11 ensures deflection of the strap 3 from the plane of the hanger 5 with the lug 15 around the upper edge 7 of the hanger by up to 180° to achieve further attachment.

Figure 2B:
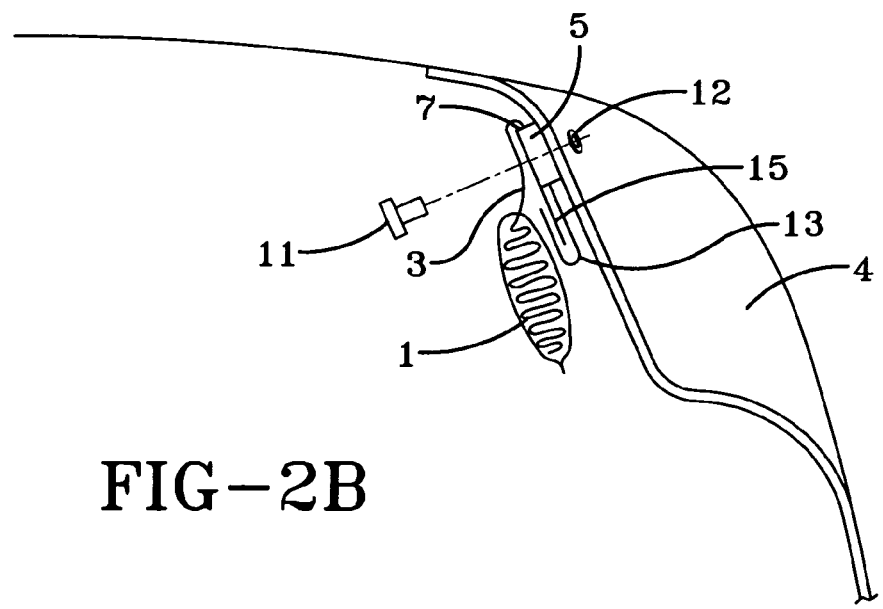
FIG. 2B is a sectional view through an airbag installed according to FIG. 2A.

FIG. 2B is a sectional view of an airbag 1 installed according to the method of FIG. 2A. The lug 15 is accommodated by the strap pocket 13 with the upwardly extending strap 3 being deflected at the upper edge 7 of the hanger 5. A deflection angle of up to 180° is provided by introduction and placing of a pin 11 through the openings 9 through the strap 3 and the hanger 5 and the structural member 4. The pin 11 is preferably made of a suitable elastomeric material and mates with appropriate means for retaining, such as retaining clip or rings 12, for securing the pin 11 in the structural member 4. It is particularly advantageous for the pin 11 to be a Christmas tree-type retainer. According to this exemplary embodiment, here too the forces arising upon airbag deployment are distributed through the upper edge 7 of the hanger 5. Together with the lug 15 and the pin 11 with the openings 9, the strap pocket 13 provides optimum immobilization of the strap 3 around the edge 7.

According to the exemplary embodiments of FIGS. 1A, 1B, 2A and 2B, the openings 9 in the strap 3 and in the hanger 5 are positioned in such a way that a pin 11 is always clipped in view above the airbag 1 after airbag mounting. This makes it possible to check visually whether the pin is securely engaged.

Figure 3A:
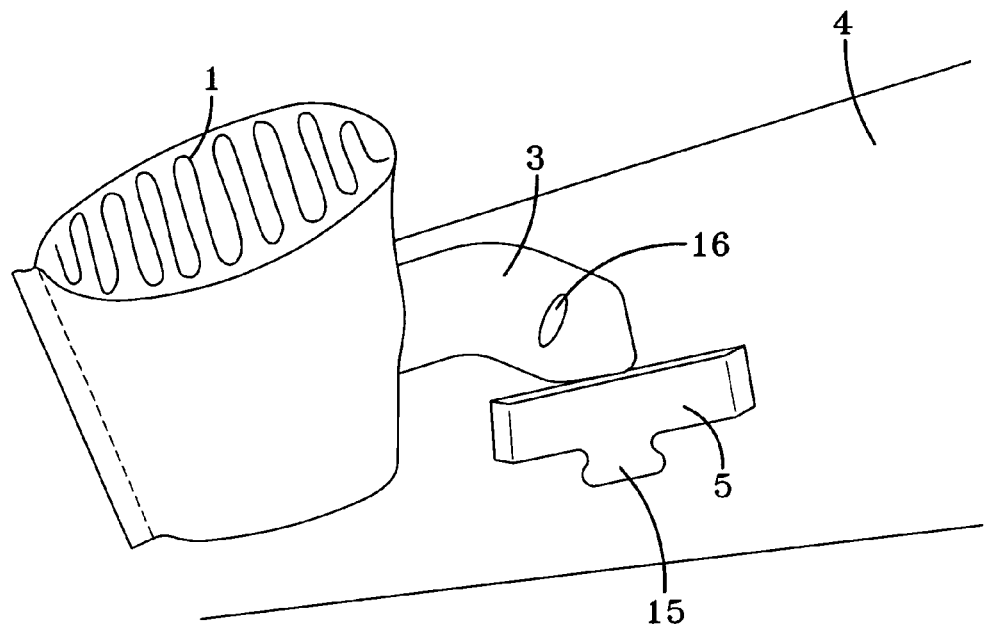
FIG. 3A is a pictorial view of a further method according to the invention for fastening an airbag to a motor vehicle structural member.

FIG. 3A is a view of a further method according to the invention for fastening an airbag 1 to a structural member 4 of a motor vehicle. The strap 3 has an opening 16 of an appropriate shape for introduction of an appropriate lug 15 of the hanger 5 into the opening 16. This attachment is provided as an alternative to or in addition to the use of pins (not shown) by fitting of the strap 3 onto the corresponding lug 15 of the hanger 5. Attachment of the airbag 1 may be made using this strap opening 16. The strap is guided from above through the passage behind the hanger 5. The opening 16 may be in the form of an ellipse. Other, especially rounded shapes or simply a small slot or cut are also feasible. The lug 15 may be provided with rounded corners to prevent damage to the material of the strap 3. The lug 15 is tapered towards the hanger side, such that the strap 3 is secured against slipping off the lug 15. The dimensions of the strap opening 16 are complementary to those of the lug 15.

Figure 3B:
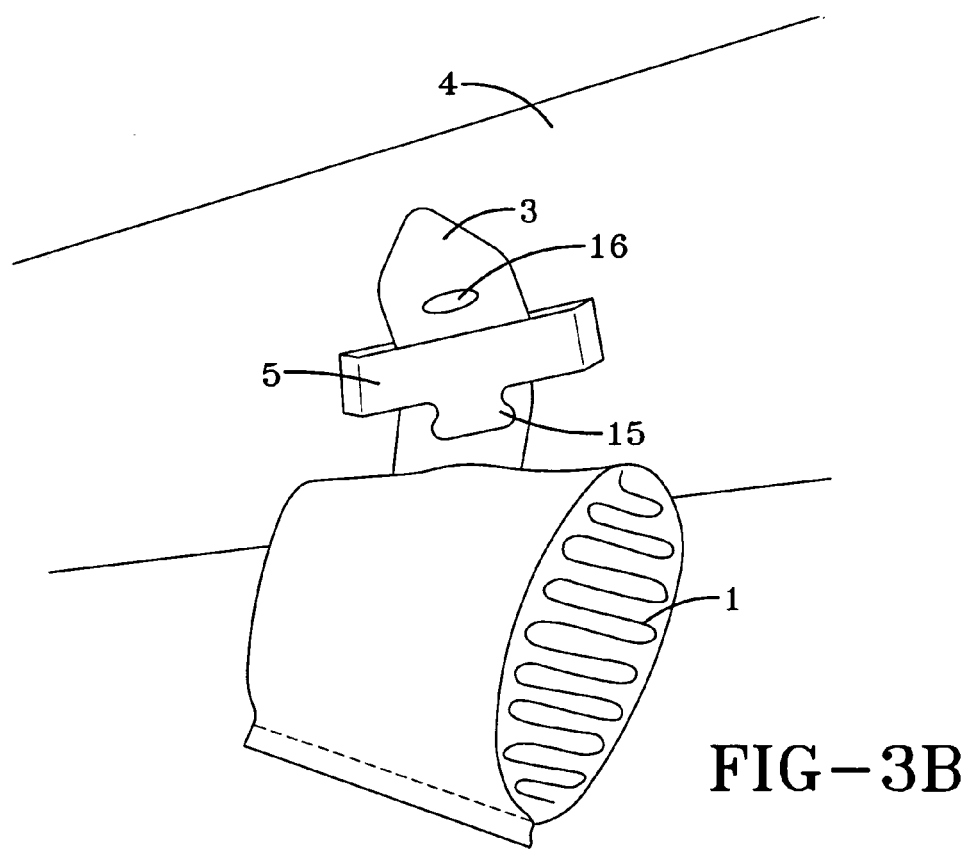
FIG. 3B is another pictorial view of the method of FIG. 3A according to the invention with an alternative introduction of the strap.

FIG. 3B is a view of the method of FIG. 3A according to the invention with alternative introduction of the strap 3. The strap is guided through from below through the passage behind the hanger 5. With this second alternative, the angle of deflection about an upper edge 7 of the hanger 5 without use of a pin 11 is greater than in the case of the first alternative according to FIG. 3A.

Figure 4A:
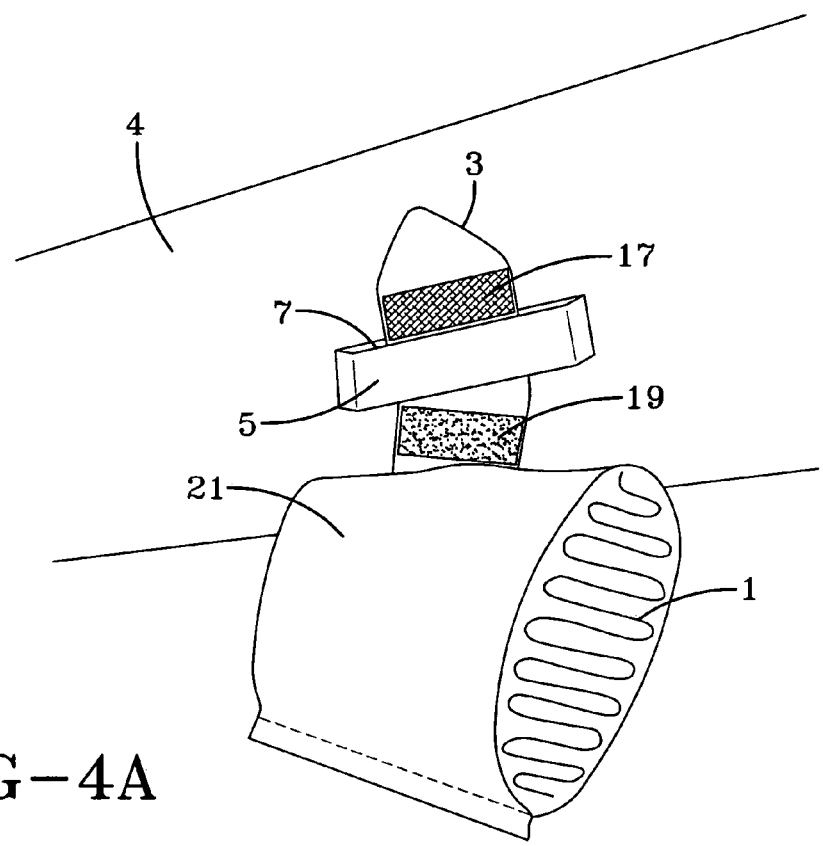
FIG. 4A is a pictorial view of a further method according to the invention for fastening an airbag to a motor vehicle structural member.

FIG. 4A shows a further exemplary embodiment for fastening an airbag 1 to a structural member 4 of a motor vehicle. Fastening is achieved by the following steps. An airbag 1 is provided with a strap 3, which serves as a hanger. The strap 3 is introduced and pushed from below through the passage behind a hanger 5 projecting from the structural member 4 of a vehicle in the manner of a bracket. The strap 3 is then folded over around an upper edge 7 of the hanger 5 by an angle of about 180°. According also to this exemplary embodiment, the forces arising upon deployment of the airbag 1 are distributed through the hanger 5 along the edge 7 around which the strap 3 is folded. To ensure hooking on of the strap 3, the airbag is attached in the installed state by a means for fastening in the form of adhesive strips 17 and/or hook and loop tapes 19, which are attached at suitable positions to the airbag sheath 21 and/or to the strap 3 of the airbag 1. Attachment is effected by hook and loop tape portions, which are attached appropriately to the strap 3. When the strap 3 is folded over round the edge 7 of the hanger 5, the two hook and loop tape portions engage with one another.

Figure 4B:
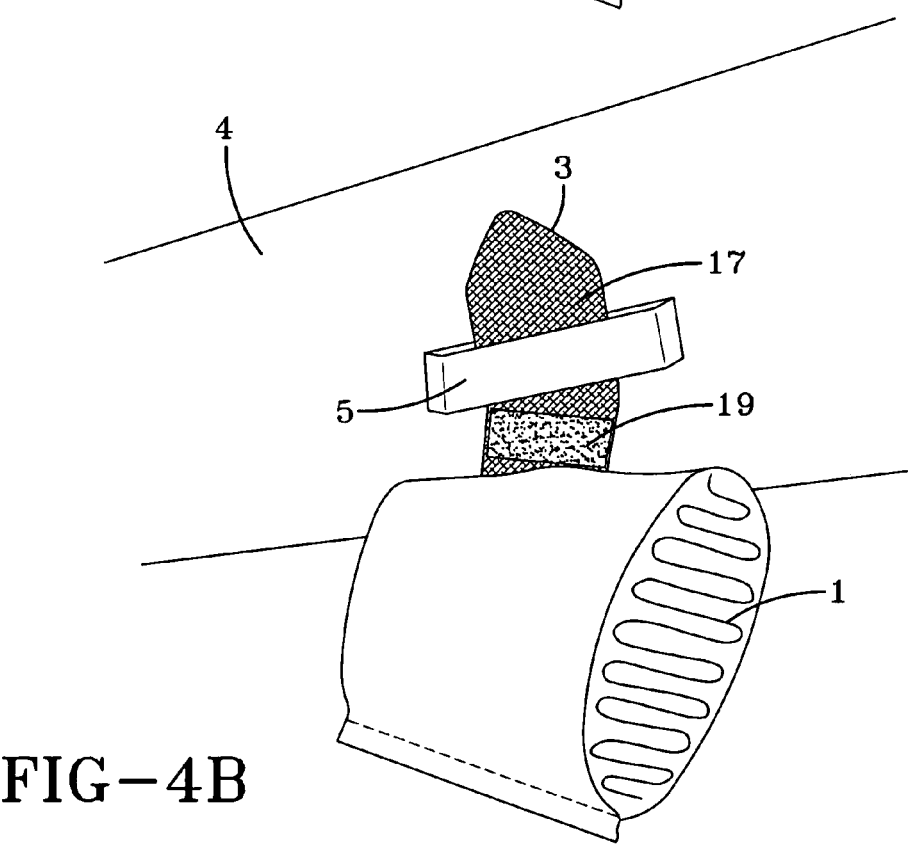
FIG. 4B is another pictorial view of the method of FIG. 3A according to the invention with an alternative arrangement of the means for fastening.

According to the exemplary embodiment of FIG. 4B, the strap 3 itself comprises hook and loop tape material, such that only the mating part of the hook and loop tape has to be attached to the strap. Attachment is preferably made by stitching. According to the exemplary embodiment of FIG. 4B, the mating part of the hook and loop tape is stitched onto the end of the strap 3 near to the airbag 1.

According to the exemplary embodiment of FIG. 1A and according to the exemplary embodiment of FIGS. 4A and 4B, the end of the strap 3 remote from the airbag 1 is in each case tapered to facilitate insertion of the strap 3 through the opening through the passage behind the hanger 5.

According to all the exemplary embodiments, the edge 7 of the loop 5 around which the strap 3 serves to absorb the airbag deployment forces is in each case the upper edge. This upper edge 7 of the loop 5 is preferably of rounded construction in order not to damage the strap material. The edge 7 is preferably horizontal, so that the airbag deployment forces are evenly distributed.

According to all the exemplary embodiments, the hanger is located in the vicinity of a side window of the vehicle. In this way, the hanger 5 may be punched into the structural member 4 of a vehicle or attached indirectly via a supporting structure to the structural member 4 of a vehicle. Attachment may be achieved by conventional welding, threaded fasteners or riveting. Of course, depending upon the length of the airbag any suitable number of straps and hangers may be employed in the attachment of the airbag assembly to the vehicle.

By guiding at least one strap through a passage behind a hanger projecting in the manner of a loop or bracket from the structural member of a vehicle, by folding it by an angle of more than 90° around at least one edge of the hanger and by attaching the strap in this position, simple, cheap and secure fastening of the airbag strap is achieved in such a way that the forces arising upon deployment of the airbag are distributed through the hanger along the edge around which the strap is attached. The strap and the hanger provide the greatest frictional force relative to one another in this area. The strap becomes immobilized or hooked in place, in the case of folding over by as much as approximately 180°, in such a way that the strap is not pulled out of the hanger even upon airbag deployment. Attachment by the means for fastening ensures that immobilization of the folded-over strap is always maintained, wherein the means for fastening remains to a considerable extent free of the absorption of forces upon deployment of the airbag. Thus, simple attachment and secure fastening of the airbag, upon deployment thereof, to the hanger and thus to a structural member of a vehicle is achieved.

According to a further preferred exemplary embodiment, the hanger 5 is provided on an explicitly separate support structure. This may be fastened to the structural member of the vehicle using suitable methods, such as for example by welding, screwing and/or riveting. Fastening by special adhesion methods is likewise feasible. The support structure with the hanger may likewise be located on the sidewall or on the roof side facing the sides of the vehicle occupants at the location of the side window.

The invention additionally provides a motor vehicle, wherein the vehicle provides a structural member having a hanger projecting in the manner of a bracket, a passage behind the hanger through which at least one strap may be guided, such that, by folding the strap by an angle of more than 90° around at least one edge of the hanger and by attaching the strap in this position, simple, cheap and secure fastening of the airbag strap is achieved. The forces arising upon deployment of the airbag are distributed through the hanger along the edge around which the strap is attached.

The aforementioned description is exemplary rather that limiting. Many modifications and variations of the present invention are possible in light of the above teachings. The preferred embodiments of this invention have been disclosed. One of ordinary skill in the art would recognize that certain modifications would come within the scope of this invention. Hence, within the scope of the appended claims, the invention may be practiced otherwise than as specifically described and the following claims should be studied to determine the true scope and content of this invention.

The invention claimed is:

1. A curtain airbag assembly comprising at least one strap for securing the curtain airbag assembly to a structural member of a motor vehicle by being guided from above or below through a passage behind a horizontal lengthwise extending hanger, the strap being folded by an angle of more than 90° around at least one horizontal edge of the hanger and the strap is secured around the hanger wherein the hanger is punched into and is part of the structural member of the vehicle projecting in the manner of a bracket from the structural member of the motor vehicle.

2. The curtain airbag assembly according to claim 1, wherein the strap has at least one opening therein for receiving at least one fastener, the fastener engaging the hanger to hold the airbag assembly in position in an installed state.

3. The curtain airbag assembly according claim 1, further comprising a sheath for protecting the airbag, wherein the sheath is provided with a frangible tear seam for release of the airbag from the sheath during a deployment of the airbag.

4. The curtain airbag assembly according claim 1, wherein an end of the strap distal from the airbag is tapered for improved insertion of the strap through a passage behind the hanger.

5. A motor vehicle comprising:
a structural member having a hanger projecting from the structural member toward the interior of the vehicle located on the sidewall or on the roof side facing the sides of the vehicle occupants in the manner of a bracket, the hanger being punched into and part of the structural member and extending horizontally lengthwise in the structural member and a curtain airbag assembly comprising at least one strap for securing the curtain airbag assembly to the structural member of the motor vehicle by being guided from above or below through a passage behind the horizontally lengthwise extending hanger, the strap being folded by an angle of more than 90° around at least one horizontal edge of the hanger and the strap is secured around the hanger by at least one means for fastening.

6. The motor vehicle according to claim 5, wherein the horizontal edge of the hanger is an upper edge of the hanger.

7. The motor vehicle according to claim 6, wherein the horizontal edge of the hanger and is curved.

8. The motor vehicle according to claims 5, wherein the strap has at least one opening therein for receiving at least one fastener, the fastener engaging the hanger to hold the airbag assembly in position in an installed state.

* * * * *